United States Patent [19]

McNabb

[11] 4,056,125
[45] Nov. 1, 1977

[54] EXTENDED LIFE STRUCTURE FOR SPOOL VALVE

[75] Inventor: Vernon L. McNabb, Van Nuys, Calif.

[73] Assignee: The Bendix Corporation, North Hollywood, Calif.

[21] Appl. No.: 618,976

[22] Filed: Oct. 2, 1975

[51] Int. Cl.² .................... F16K 47/08; F16B 13/04
[52] U.S. Cl. .......................... 137/625.3; 137/625.69; 251/127
[58] Field of Search ................ 137/625.3, 625.69; 251/127

[56] References Cited

U.S. PATENT DOCUMENTS

| 3,853,146 | 12/1974 | Blair | 137/625.3 |
| 3,899,001 | 8/1975 | Orme | 137/625.3 |
| 3,917,221 | 11/1975 | Kubota et al. | 251/127 |

FOREIGN PATENT DOCUMENTS

| 780,188 | 7/1957 | United Kingdom | 138/42 |

Primary Examiner—Alan Cohan
Assistant Examiner—Gerald A. Michalsky
Attorney, Agent, or Firm—Robert C. Smith; William F. Thornton

[57] ABSTRACT

Multiple path means for a fluid flow control device is shown in connection with a typical spool type servo valve wherein the spool member moves within a stationary sleeve to control fluid flow to a piston in a cylinder. The multiple path means includes a series of stacks of washer-like elements or disks which are positioned in radial bores in the valve sleeve and which disks cooperate when the spool number moves a small distance from null to define a restricted path across the stack in which flow is forced through a series of alternating chambers and orifices with measured pressure drops across the orifices. Further movement of the spool member away from null opens a large parallel flow path. Since many servo valves have comparatively short travel and since both control and wear problems of such valves tend to be most serious near null, the restricted flow path is utilized to minimize abrupt step flow gains with the usual accompanying wear around null.

3 Claims, 5 Drawing Figures

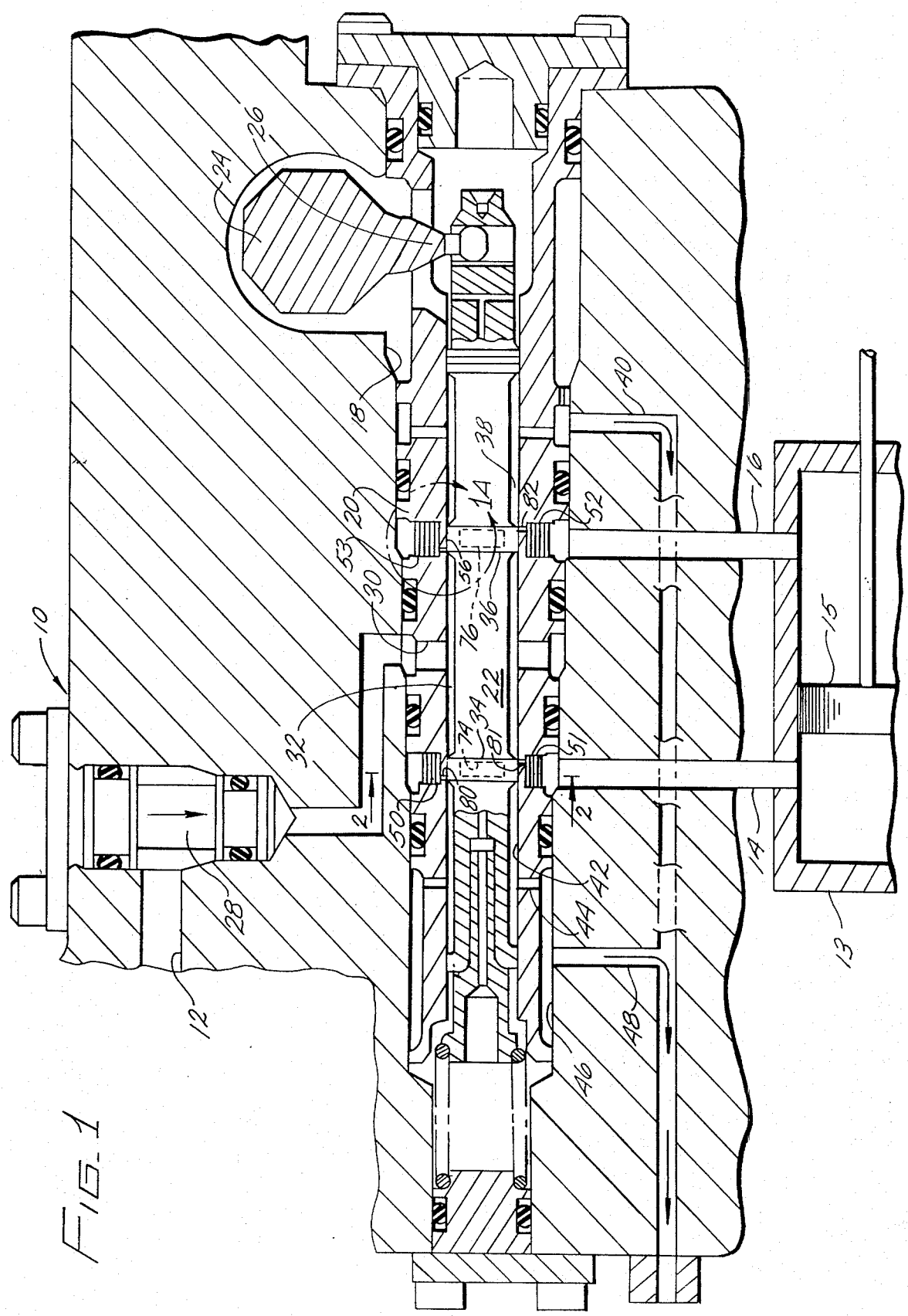

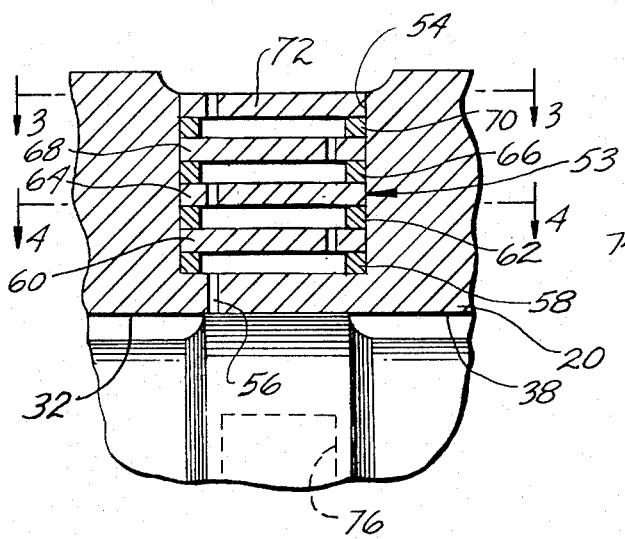
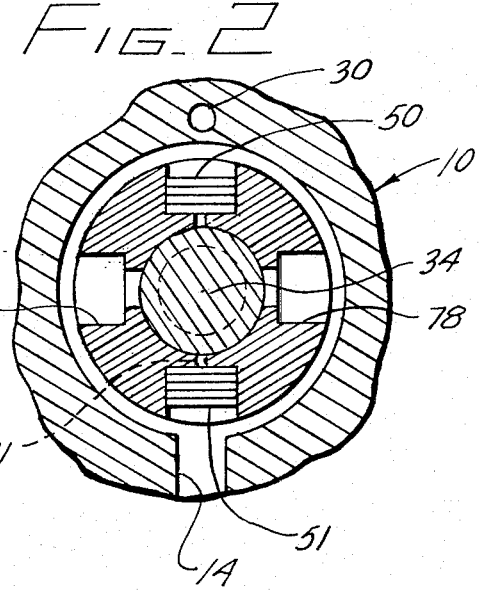
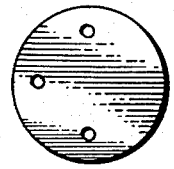
DISKS 60, 64, 68 & 72
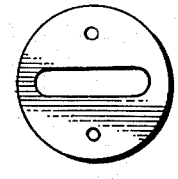
DISKS 58, 62, 66 & 70
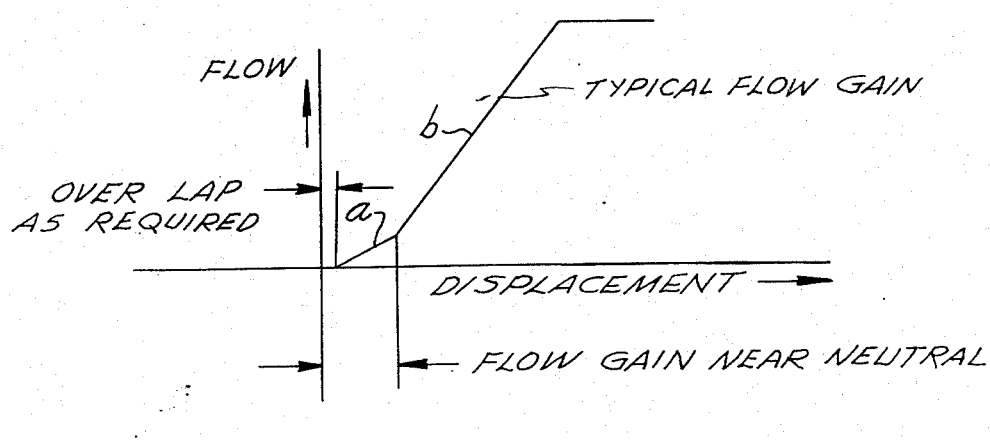

EXTENDED LIFE STRUCTURE FOR SPOOL VALVE

BACKGROUND OF THE INVENTION

In many flow control applications there is a need for structures which can vary the fluid-flow rate of flowing fluids without the production of excessive wear, noise or vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term "throttling valve."

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. The conventional spool-type hydraulic servo valve is typical of this type of valve.

Hydraulic systems of commercial aircraft usually employ phosphate-ester-based hydraulic fluids because of their fire-resistant properties. These fluids, however, have been found to be extremely erosive in the throttling or metering control valves of these systems. In effect, they induce an electrochemical milling action on the valve metering edges which is quite apart from the normal wear associated with fluid flow. Improvements have been made in the fluids, and various attempts at valve design changes have effected some gains; however, the problem remains a severe one with valves surviving from only a few hours to an acceptable life, but with operating lives still substantially below that of valves that work in most other fluid systems. The phenomenon is characteristic of other fluids; however, the severity with which it occurs in hydraulic systems using phosphate-ester-based fluids is particularly unique.

In systems using phosphate-ester-based fluids, one of the most erosive conditions extant can be found on valves which are underlapped (or have zero lap) and remain at null or near null for long periods of time. The configurations involved include flight control system valves, spoiler control system valves, flap control valves (which are modulating types), relief valves that have continuous low leakage or erode to that condition, and other valves that are high differential pressure-throttling configurations with continuous "built-in" or "eroded to" flow conditions. Once flow is established and the "electrochemical milling" begins, the erosion is usually continuous until the leakage rate of the valve is no longer tolerable.

Many structures have been devised in an attempt to deal with the damage resulting from operation of valves in high pressure systems. Most of these have involved some form of baffling means which operate to divide the flow and cause the pressure drops to be taken at various locations rather than across a single metering edge. One such arrangement is described in the copending application of Ralph L. Vick, Serial No. 470,251 filed May 15, 1974 (common assignee) now U.S. Pat. No. 3,978,891, in which flow is divided into fine streams by a series of stacked annular disks surrounding a spool valve and in which each small stream is caused to flow into a chamber, from thence across an orifice to another chamber, reversing direction through another orifice, etc., radially across the disks. In this arrangement the pressure drops across the disks are essentially those caused by the orifices in series. The annular disk stack includes a number of disks of different orifice and opening patterns and these must be assembled in its proper order and carefully aligned radially, before the stack is assembled. This, of course, is expensive and results in a moderately expensive sleeve structure to produce. A less expensive structure which would provide essentially the same operation would be desirable.

DESCRIPTION OF THE DRAWINGS

FIG. 1 is a cross-sectional view of a typical spool-type servo valve using my invention;

FIG. 1A is an enlarged view of a portion of the spool and sleeve assembly like that of FIG. 1 with the sleeve and disk structure shown in section;

FIG. 2 is a sectional view taken along line 2—2 of FIG. 1;

FIG. 3 is a plan view of an orifice disk like that shown in FIG. 1A;

FIG. 4 is a plan view of a spacer disk like that shown in FIG. 1A; and

FIG. 5 is a graph showing the relationship of flow vs. displacement of a valve such as that of FIG. 1 wherein the disks of FIGS. 3 and 4 are used.

DESCRIPTION OF THE PREFERRED EMBODIMENT

A flow control valve is shown generally at numeral 10 whose purpose is to control flow to an external utilization device such as a cylinder. Fluid from a source not shown is applied to an inlet passage 12, and flow from the valve member 10 is provided to an actuating cylinder 13 through outlet conduits 14 and 16 connected to opposite sides of a piston 15. Positioned within valve 10 is a generally cylindrical chamber 18 having a plurality of different diameters. The stationary sleeve member 20, having a plurality of matching diameters, is positioned in chamber 18. Axially movable within the sleeve 20 is a spool valve 22 which is directly driven mechanically by means of a rotatable control member 24 having an extendible arm 26 engaging the spool member 22.

Fluid flow entering inlet passage 12 passes a conventional check valve 28 and flows through an orifice or series of orifices 30 which are radially positioned through the side wall of sleeve member 20 to provide communication to a chamber 32. Defining the ends of chamber 32 are a pair of lands 34 and 36 movable axially with spool valve member 22 in such manner as to direct high pressure inlet fluid from chamber 32 into either of cylinder passages 14 or 16. When spool member 22 has moved toward the left, land 34 is similarly displaced, thus opening communication between chamber 32 and passage 14. At the same time, land 36 also moves to the left, opening communication between passage 16 and a chamber 38 which communicates with return pressure through a line 40. This results in movement of piston 15 toward the right. Movement of the spool 22 in the opposite direction results in connecting high pressure fluid from chamber 32 to line 16 and permitting fluid on the left side of the cylinder 15 to be exhausted through passageway 14 into a chamber 42 which communicates with return conduit 40 through a port 44, a chamber 46 and a passageway 48, and causing piston 15 to be moved toward the left.

Radially aligned with lands 34 and 36 in radially-directed ports in sleeve 20 are stacks of disks 50, 51, 52 and 53, respectively, which are stacked in a face-to-face relationship and which include patterns of openings and orifices which divide the flow into a number of flow paths for minimizing wear, noise and/or erosion damage to the valve which might otherwise result because of the high pressure differentials employed. It will be observed that with the particular valve configuration shown, flow may be directed across the disks either from inside to outside of the sleeve or from outside to inside, depending upon which set of disks is considered and which direction the spool 22 is moved. Axially aligned with the stacks but displaced approximately 90° around the sleeve are large area slots 74 and 76. (See also FIG. 2).

FIG. 1A is an enlarged view of a portion of FIG. 1 wherein the disks are shown in section to clarify the structure and the flow patterns therethrough. The disk stack 53 is placed in a radial bore 54 which is generally aligned with the position of land 36 when the spool member 22 is at null. Providing communication between the inside of sleeve 20 and the bore 54 is a small radial passageway 56 whose axial position is just slightly to the right of the left edge of land 36. This axial distance may be varied depending upon the amount of dead band which can be tolerated. For a very sensitive valve with essentially no overlap, passage 56 would be placed as close to the edge of land 36 as possible without permitting excessive leakage. Similar passageways 80, 81 and 82 are placed adjacent stack 50 near the left edge of land 34, adjacent stack 51 adjacent the right edge of land 34 and adjacent stack 52 near the right edge of stack 52 respectively (FIG. 1).

The stack 53 in bore 54 consists of a group of disk elements 58, 60, 62, 64, 66, 68, 70 and 72. The number may vary depending upon the number of orificial stages required. The alternate disks 60, 64, 68, and 72 are orifice disks and appear in plan view as in FIG. 3. Disks 58, 62, 66 and 70 are slotted spacer disks as shown in FIG. 4. Other shapes of central opening could be used so long as they communicate with the orifices in the adjacent orifice disks. Such openings need not be symmetrical around the axis of the disk, but should not be open at the side. Openings in the spacer disks define the areas of chambers connected by the orifices in the adjacent disks. The disks 60, 64, 68 and 72 containing the orifices are preferably of thinner metal than the slotted disks since it is desirable that the orifice opening have a minimum of height so that they operate as nearly as practical to sharp-edged orifices. Again, the orifices should not be in alignment with each other since a substantial velocity component tending to direct flow through one orifice from another will tend to reduce the pressure drop across the former. When many individual disks are made as shown in FIGS. 3 and 4 they are assembled into a stack with the desired number of orificial stages and brazed together to form a unitary stack. This stack is then inserted into the bore 54 and fastened in as desired, usually also by brazing. The fastening means must be secure since very little radial movement could be tolerated without interfering with the action of the disks. Also, any looseness of individual disks could lead to undesirable leakage, vibration and noise.

FIG. 5 shows a typical flow vs. displacement pattern of a valve such as that described. Operation may best be understood while considering this graph. With reference to FIGS. 1 and 1A, an initial small movement of spool member 22 and land 36 toward the right would result in no flow until such movement is sufficient to bring the left edge of land 36 far enough to expose passage 56 to the high pressure in chamber 32. Further movement results in a low rate of flow gain until passageway 56 is completely uncovered as shown in the curve portion marked "a." At the same time return flow from passage 14 will flow through stack 50 from the outside into chamber 42 and to return, as described. A further increment of movement toward the right will expose large area-slots 74 and 76 and also slot 78 which is visible only in FIG. 2. A similar slot would be visible opposite slot 76 in a corresponding section taken through stacks 52 and 53. As these large area slots are progressively exposed the flow increases substantially with displacement along the portion of the curve marked "b" until saturation occurs. Displacement of spool member 22 in the opposite direction results in a symmetrical pattern on the opposite side of the origin.

While only a single embodiment has been disclosed it is recognized that those skilled in the art will be able to devise modifications within the scope of the present invention. Thus, while the disk stacks are shown in the control conduit lines to and from the cylinder, they could also be placed in the inlet pressure and return pressure lines. The number of disks in each stack becomes a function of the number of orifice stages required to provide the desired reduction in pressure drop across the spool metering edges. Where disk area is adequate the flow pattern may be "folded" to produce more orifice stages such that the flow pattern reverses itself twice before leaving the stack. This would require that the spacer disks have internal dividers to prevent flow into parallel chambers, thus by-passing some orifices. More stacks may be incorporated around the sleeve if needed and if sufficient space is available. It will be appreciated that the disks as shown in FIGS. 3 and 4 are very simple in design and, particularly where only two obviously different disks are used, assembly of each stack is quite easy and less subject to error than in some prior art arrangements where several different disk patterns are used and the differences between disks may be quite subtle. Obviously, where it becomes necessary, more complex disk patterns may be used herein also, as in the folded path arrangement described above. Also, the disks in the various stacks may be made quite small with minimum practical diameters thereof being in the range of 0.150 inch.

I claim:

1. In a flow control valve wherein a spool valve member having a plurality of lands is moveable within a sleeve to cause said lands to open and close radially directed fluid passageways through the sidewalls of said sleeve, at least some of said passageways including cylindrical chambers and fine radial passageways communicating said chambers with the inside of said sleeve, and a stack of laminar disk members positioned in said cylindrical chambers, said stack including disks of a first group including a central opening of large area and disks of a second group including an orifice of limited area each of which introduces a substantial pressure drop thereacross, said stack comprising alternate disks of said first group and said second group with a disk of said first group positioned at the bottom of said cylindrical chamber such that its opening communicates with one of said fine passageways, said sleeve also including large openings axially displaced from said fine passageways such that as said spool valve member moves past said fine passageways it begins to uncover said large openings.

2. A flow control valve as set forth in claim 1 wherein the disks of said second group are alternately radially misaligned with each other such that their orifices are not in alignment but all communicate with the opening of their adjacent disks of said first group.

3. A flow control valve as set forth in claim 1 wherein each of said fine passageways are positioned such that they are just covered by an adjacent land of said spool valve member when said member is at null position.

* * * * *